(12) United States Patent
Luty et al.

(10) Patent No.: US 7,404,188 B2
(45) Date of Patent: Jul. 22, 2008

(54) METHOD AND SOFTWARE FOR PUBLISHING A BUSINESS PROCESS ORCHESTRATION AS A WEB SERVICE

(75) Inventors: Andrew R. Luty, Redmond, WA (US); Andrew H. Wu, Sammamish, WA (US); Udaya Kumar Bhaskara, Redmond, WA (US); Jean-Emile Elien, Bellevue, WA (US); Joseph A. Klug, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 979 days.

(21) Appl. No.: 10/740,045

(22) Filed: Dec. 18, 2003

(65) Prior Publication Data

US 2005/0138634 A1 Jun. 23, 2005

(51) Int. Cl.
*G06F 9/44* (2006.01)
*G06F 9/48* (2006.01)
*G06F 9/54* (2006.01)

(52) U.S. Cl. .................... 719/315; 719/316; 719/328; 719/330; 717/108

(58) Field of Classification Search ................. 719/315, 719/316, 328, 330; 717/108
See application file for complete search history.

(56) References Cited

U.S. PATENT DOCUMENTS

| 7,114,146 | B2 * | 9/2006 | Zhang et al. ................ 717/106 |
| 2002/0147713 | A1 * | 10/2002 | Smith ............................ 707/3 |
| 2004/0015564 | A1 * | 1/2004 | Williams ..................... 709/219 |
| 2004/0205765 | A1 * | 10/2004 | Beringer et al. ............. 719/311 |

OTHER PUBLICATIONS

Nicholas Nicoloudis and Christine Mingins, "XML Web Services Automation: A Software Engineering Approach," IEEE Computer Society, Dec. 2000, 8 pages.*

* cited by examiner

*Primary Examiner*—Li B Zhen
(74) *Attorney, Agent, or Firm*—Woodcock Washburn LLP

(57) ABSTRACT

A method of generating code that permits client access to a business process orchestration running on a server as a web service using the Simple Object Access Protocol (SOAP). Business process orchestrations in XLANG are converted to a web service implementation description from which the Web services code is generated. During runtime, when a SOAP request message comes into the server, it is passed to the target web method. The message is then passed to a Web services adapter that submits the request for further processing by the backend system. The response is forwarded to the Web services adapter, which returns the response as a SOAP response message to the client.

21 Claims, 15 Drawing Sheets

FIG. 22

```
[Microsoft.XLANGs.BaseTypes.BPELExportable(true)]
[Microsoft.XLANGs.BaseTypes.TargetXmlNamespaceAttribute("http://ModuleTns")]
module WebSvcPubTest
{
    private messagetype ClrTypesMultipartType
    {
        body System.String StringMessagePart;
        System.Int32 Int32MessagePart;
        System.DateTime DateTimeMessagePart;
    };
    public porttype ClrTypesPortType
    {
        requestresponse ClrTypesOperation
        {
            WebSvcPubTest.ClrTypesMultipartType, WebSvcPubTest.ClrTypesMultipartType
        };
    };
    [Microsoft.XLANGs.BaseTypes.BPELExportable(false)]
    private service ClrTypesOrchestration
    {
        [Microsoft.XLANGs.BaseTypes.LogicalBinding()]
        port implements WebSvcPubTest.ClrTypesPortType ClrTypesPort;
        message WebSvcPubTest.ClrTypesMultipartType ClrTypesMessage;
        body ()
        {
            activate receive (ClrTypesPort.ClrTypesOperation, ClrTypesMessage);
            send (ClrTypesPort.ClrTypesOperation, ClrTypesMessage);
        }
    }
}

// service "WebSvcPubTest.ClrTypesOrchestration" port "ClrTypesPort"
[System.Web.Services.WebServiceBindingAttribute(Name="WebSvcPubTest_ClrTypesOrchestration_ClrTypesPort", Namespace="http://ModuleTns")]
[System.Web.Services.WebServiceAttribute(Name="WebSvcPubTest_ClrTypesOrchestration_ClrTypesPort", Namespace="http://ModuleTns", Description="...")]
public sealed class WebSvcPubTest_ClrTypesOrchestration_ClrTypesPort : Microsoft.BizTalk.WebServices.ServerProxy.ServerProxy
{
    // operation "ClrTypesOperation"
    [System.Web.Services.WebMethodAttribute()]
    [System.Web.Services.Protocols.SoapDocumentMethodAttribute("http://ModuleTns/WebSvcPubTest_ClrTypesOrchestration_ClrTypesPort/ClrTypesOperation",
    OneWay=false, Use=System.Web.Services.Description.SoapBindingUse.Literal, ParameterStyle=System.Web.Services.Protocols.SoapParameterStyle.Default)]
    [return: System.Xml.Serialization.XmlElementAttribute(Namespace=null, ElementName="StringMessagePart")]
    public string ClrTypesOperation(
    [System.Xml.Serialization.XmlElementAttribute(Namespace=null, ElementName="StringMessagePart")] string StringMessagePart,
    [System.Xml.Serialization.XmlElementAttribute(Namespace=null, ElementName="Int32MessagePart")] int Int32MessagePart,
    [System.Xml.Serialization.XmlElementAttribute(Namespace=null, ElementName="DateTimeMessagePart")] System.DateTime DateTimeMessagePart,
    [System.Xml.Serialization.XmlElementAttribute(Namespace=null, ElementName="Int32MessagePart")] out int Int32MessagePart_,
    [System.Xml.Serialization.XmlElementAttribute(Namespace=null, ElementName="DateTimeMessagePart")] out System.DateTime DateTimeMessagePart_
    )
    {
        System.Collections.ArrayList inHeaders = null;
        System.Collections.ArrayList inoutHeaders = null;
        System.Collections.ArrayList inoutHeaderResponses = null;
        System.Collections.ArrayList outHeaderResponses = null;
        System.Web.Services.Protocols.SoapUnknownHeader[] unknownHeaderResponses = null;
        // Parameter information
        object[] invokeParams = new object[] {
            StringMessagePart,
            Int32MessagePart,
            DateTimeMessagePart};
        Microsoft.BizTalk.WebServices.ServerProxy.ParamInfo[] inParamInfos = new Microsoft.BizTalk.WebServices.ServerProxy.ParamInfo[] {
            new Microsoft.BizTalk.WebServices.ServerProxy.ParamInfo(typeof(string), "StringMessagePart"),
            new Microsoft.BizTalk.WebServices.ServerProxy.ParamInfo(typeof(int), "Int32MessagePart"),
            new Microsoft.BizTalk.WebServices.ServerProxy.ParamInfo(typeof(System.DateTime), "DateTimeMessagePart")};
        Microsoft.BizTalk.WebServices.ServerProxy.ParamInfo[] outParamInfos = new Microsoft.BizTalk.WebServices.ServerProxy.ParamInfo[] {
            new Microsoft.BizTalk.WebServices.ServerProxy.ParamInfo(typeof(string), "StringMessagePart"),
            new Microsoft.BizTalk.WebServices.ServerProxy.ParamInfo(typeof(int), "Int32MessagePart"),
            new Microsoft.BizTalk.WebServices.ServerProxy.ParamInfo(typeof(System.DateTime), "DateTimeMessagePart")};
        string bodyTypeAssemblyQualifiedName = "System.String, mscorlib, Version=1.0.5000.0, Culture=neutral, PublicKeyToken=b77a5c561934e089";
        // BizTalk invocation
        object[] invokeResults = this.Invoke("ClrTypesOperation", invokeParams, inParamInfos, outParamInfos, 0, bodyTypeAssemblyQualifiedName,
            inHeaders, inoutHeaders, out inoutHeaderResponses, out outHeaderResponses, null, null, null, out unknownHeaderResponses, false, false);
        string returnValue = ((string)(invokeResults[0]));
        Int32MessagePart_ = ((int)(invokeResults[1]));
        DateTimeMessagePart_ = ((System.DateTime)(invokeResults[2]));
        return returnValue;
    }
}
```

```
[Microsoft.XLANGs.BaseTypes.BPELExportable(true)]
[Microsoft.XLANGs.BaseTypes.TargetXmlNamespaceAttribute("http://ModuleTns")]
module WebSvcPubTest
{
    private messagetype XsdTypesMultipartType
    {
        body WebSvcPubTest.Schema1 Schema1MessagePart;
        WebSvcPubTest.Schema2 Schema2MessagePart;
    };
    public porttype XsdTypesPortType
    {
        requestresponse XsdTypesOperation
        {
            WebSvcPubTest.XsdTypesMultipartType, WebSvcPubTest.XsdTypesMultipartType
        };
    };
    [Microsoft.XLANGs.BaseTypes.BPELExportable(false)]
    private service XsdTypesOrchestration
    {
        [Microsoft.XLANGs.BaseTypes.LogicalBinding()]
        port implements WebSvcPubTest.XsdTypesPortType XsdTypesPort;
        message WebSvcPubTest.XsdTypesMultipartType XsdTypesMessage;
        body ()
        {
            activate receive (XsdTypesPort.XsdTypesOperation, XsdTypesMessage);
            send (XsdTypesPort.XsdTypesOperation, XsdTypesMessage);
        }
    }
}
```

FIG. 23

```
// service "WebSvcPubTest.XsdTypesOrchestration" port "XsdTypesPort"
[System.Web.Services.WebServiceBindingAttribute(Name="WebSvcPubTest_XsdTypesOrchestration_XsdTypesPort", Namespace="http://ModuleTns")]
[System.Web.Services.WebServiceAttribute(Name="WebSvcPubTest_XsdTypesOrchestration_XsdTypesPort", Namespace="http://ModuleTns", Description="...")]
public sealed class WebSvcPubTest_XsdTypesOrchestration_XsdTypesPort : Microsoft.BizTalk.WebServices.ServerProxy.ServerProxy
{
    // operation "XsdTypesOperation"
    [System.Web.Services.WebMethodAttribute()]
    [System.Web.Services.Protocols.SoapDocumentMethodAttribute("http://ModuleTns/WebSvcPubTest_XsdTypesOrchestration_XsdTypesPort/XsdTypesOperation",
     OneWay=false, Use=System.Web.Services.Description.SoapBindingUse.Literal, ParameterStyle=System.Web.Services.Protocols.SoapParameterStyle.Default)]
    [return: System.Xml.Serialization.XmlElementAttribute(Namespace="http://WebSvcPubTest.Schema1", ElementName="Schema1Root")]
    public WebSvcPubTest.XsdTypes2.Schema1Root XsdTypesOperation(
        [System.Xml.Serialization.XmlElementAttribute(Namespace="http://WebSvcPubTest.Schema1", ElementName="Schema1Root")]
WebSvcPubTest.XsdTypes2.Schema1Root Schema1MessagePart,
        [System.Xml.Serialization.XmlElementAttribute(Namespace="http://WebSvcPubTest.Schema2", ElementName="Schema2Root")]
WebSvcPubTest.XsdTypes1.Schema2Root Schema2MessagePart,
        [System.Xml.Serialization.XmlElementAttribute(Namespace="http://WebSvcPubTest.Schema2", ElementName="Schema2Root")] out
WebSvcPubTest.XsdTypes1.Schema2Root Schema2MessagePart_
    )
    {
        System.Collections.ArrayList inHeaders = null;
        System.Collections.ArrayList inoutHeaders = null;
        System.Collections.ArrayList inoutHeaderResponses = null;
        System.Collections.ArrayList outHeaderResponses = null;
        System.Web.Services.Protocols.SoapUnknownHeader[] unknownHeaderResponses = null;
        // Parameter information
        object[] invokeParams = new object[] {
            Schema1MessagePart,
            Schema2MessagePart};
        Microsoft.BizTalk.WebServices.ServerProxy.ParamInfo[] inParamInfos = new Microsoft.BizTalk.WebServices.ServerProxy.ParamInfo[] {
            new Microsoft.BizTalk.WebServices.ServerProxy.ParamInfo(typeof(WebSvcPubTest.XsdTypes2.Schema1Root), "Schema1MessagePart"),
            new Microsoft.BizTalk.WebServices.ServerProxy.ParamInfo(typeof(WebSvcPubTest.XsdTypes1.Schema2Root), "Schema2MessagePart")};
        Microsoft.BizTalk.WebServices.ServerProxy.ParamInfo[] outParamInfos = new Microsoft.BizTalk.WebServices.ServerProxy.ParamInfo[] {
            new Microsoft.BizTalk.WebServices.ServerProxy.ParamInfo(typeof(WebSvcPubTest.XsdTypes2.Schema1Root), "Schema1MessagePart"),
            new Microsoft.BizTalk.WebServices.ServerProxy.ParamInfo(typeof(WebSvcPubTest.XsdTypes1.Schema2Root), "Schema2MessagePart")};
        string bodyTypeAssemblyQualifiedName = "WebSvcPubTest.Schema1, WebSvcPubTest, Version=1.0.0.0, Culture=neutral, PublicKeyToken=a25c862bf4c35d82";
        // BizTalk invocation
        object[] invokeResults = this.Invoke("XsdTypesOperation", invokeParams, inParamInfos, outParamInfos, 0, bodyTypeAssemblyQualifiedName,
            inHeaders, inoutHeaders, out inoutHeaderResponses, out outHeaderResponses, null, null, null, out unknownHeaderResponses, false, false);
        WebSvcPubTest.XsdTypes2.Schema1Root returnValue = ((WebSvcPubTest.XsdTypes2.Schema1Root)(invokeResults[0]));
        Schema2MessagePart_ = ((WebSvcPubTest.XsdTypes1.Schema2Root)(invokeResults[1]));
        return returnValue;
    }
}
```

METHOD AND SOFTWARE FOR PUBLISHING A BUSINESS PROCESS ORCHESTRATION AS A WEB SERVICE

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright© 2003, Microsoft Corporation, All Rights Reserved.

FIELD OF THE INVENTION

This invention relates in general to the field of web services. More particularly, this invention relates to a system and method of exposing backend workflows as Web services.

BACKGROUND OF THE INVENTION

Standalone applications and Web sites create islands of functionality and data. Users are forced to navigate manually between Web sites, devices, and applications, logging in each time, and rarely being able to carry data from one site to another. This makes business tasks that ought to be simple, such as arranging a meeting with colleagues from partner companies and automatically updating every attendee's calendar, very difficult. This inefficiency is a major source for productivity loss.

As a result of the changes in how businesses and consumers use the Web, the industry is converging on a new computing model that enables a standard way of building applications and processes to connect and exchange information over the Web. This new Internet-based integration methodology, called "XML Web services," enables applications, machines, and business processes to work together. Web services describe themselves to the outside world; telling what functions they perform, how they can be accessed, and what kinds of data they require. The widespread support around XML assures that businesses will cooperate in the Internet-based economy with this XML Web services model.

The XML Web services utilize XML (extensible Markup Language), which is an open industry standard managed by the World Wide Web Consortium. It enables developers to describe data being exchanged between PCs, smart devices, applications, and Web sites, etc. Because the data is separate from the format and style definitions, it can be easily organized, programmed, edited, and exchanged between Web sites, applications, and devices. XML has transformed how applications talk to each other, thus more and more businesses are exchanging data and processing documents electronically.

However, many businesses have systems that are incompatible with XML. Thus, these systems cannot be called as Web services. A solution to this problem is found in the BizTalk Framework, available from Microsoft Corporation of Redmond, Wash., which addresses these interoperability challenges in a platform and technology-neutral manner. It provides specifications for the design and development of XML-based messaging solutions for communication between applications and organizations. BizTalk is capable of receiving documents submitted through a wide variety of transports, such as HTTP, SMTP, and SOAP; as e-mail attachments; through the message bus; programmatically through exposed APIs; and through adapter components. The BizTalk Server receive locations monitor HTTP, MSMQ message queues, and file locations for incoming business documents. The receive locations are responsible for submitting the received documents on to a receive pipeline, the second step in the process.

A BizTalk Server receive pipeline is set up to receive incoming documents that conform to a specific XSD schema, which defines the structure of the business data within the document. When the document arrives through a receive function, a receive pipeline can log the whole document or any portion of it to the BizTalk Document Tracking database for later analysis, or transform the document to conform to the schema of the target application. After documents are received and mapped to the format of the target application, they are delivered either directly to that application or to a business process orchestration that manages delivery to multiple target applications.

However, with all the functionality that BizTalk offers, it does not provide a method of exposing backend systems and workflows (i.e., business process orchestrations) as XML Web services. The present invention provides such a solution.

SUMMARY OF THE INVENTION

The present invention is directed to systems and methods for generating a Web service to expose a backend business process orchestration. According to a first aspect, the method includes generating an ASP.NET web service project from an assembly representative of the business process orchestration; generating service proxy code from publishing configuration information derived from said assembly; and wrapping the service proxy code within a web service containing web methods.

According to a feature of the invention, generating the web service project uses reflection to extract information regarding orchestrations and ports contained in the assembly. The information is imported into a web service implementation description (i.e., publishing configuration).

The method may also include mapping from XLANG to web service implementation and WSDL. ASP.NET implicitly generates a WSDL from the web service implementation through the use of .NET Reflection. In this case the method may include generating classes to represent XSD schema types and type references with appropriate assembly references for Common Language Runtime (CLR) types (i.e., .NET classes).

XLANG port and porttypes may be mapped to a porttype element in the WSDL file. A binding element in the WSDL file may be generated by concatenating at least two of XLANG module name, service, and port. Also, a service in XLANG may be mapped to a service element in the WSDL file. The mappings to the WSDL file are accomplished through generation of the web service implementation.

According to another aspect of the present invention there is provided a method of exposing a business process orchestration as a Web service. The method includes providing a graphical user interface to guide a user through a process of defining parameters of the Web service; and generating a Web service project in accordance with the defined parameters.

According to another aspect of the present invention there is provided a method of specifying a web service by editing a web service implementation description to describe web methods, request and response messages, and message types. Message types are specified by selecting XSD schema types from assemblies containing document schemas.

In accordance with a feature of the invention, the parameters may include an assembly to export, SOAP headers, a name and location of a Web services project, and orchestrations and ports associated with the assembly.

In accordance with another feature, the underlying Web service code associated with the Web service project is provided to the user for further customization.

In accordance with another aspect of the invention, there is provided a method of receiving data submitted to a web service and web methods exposing a business process orchestration. The method includes receiving a web method request; submitting the request to an adapter for web services; submitting the request to a receive pipeline and passing the request as a document to an orchestrationport; and passing the document to a backend application for processing.

In accordance with a feature of the invention, the web method request is received as a SOAP message. Each part of the SOAP message may correspond to a parameter to be passed to a target web method.

In accordance with another feature, a response may be returned from the backend application, where the response may be wrapped in a SOAP response message for return to a client.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIGS. 22-23 show exemplary XLANGS input and corresponding web service implementation output resulting from the present invention.

DETAILED DESCRIPTION OF PREFERRED EMBODIMENTS

Exemplary Computing Environment

Figure 1:
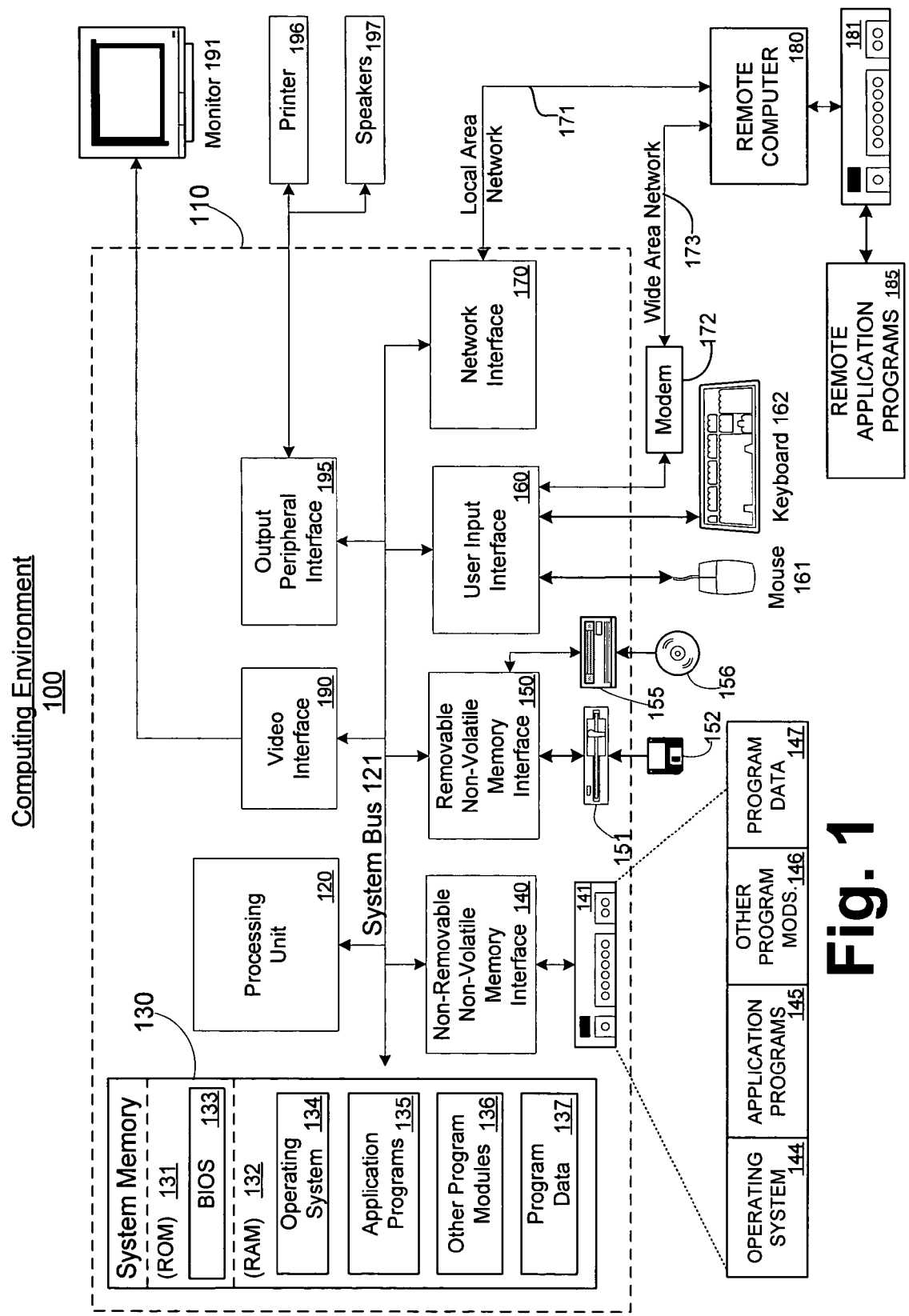
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Embodiment of Publishing Business Process Orchestrations as Web Services Web services are described in XML and are communicated over the existing HTTP infrastructure. Web services can be written and called in almost any language: VC++, C#, VB, Java, and JavaScript. The transport of XML over HTTP has been codified as the Simple Object Access Protocol (SOAP). SOAP is a specification that defines the XML format for messages.

Web services are called with messages that are written in the SOAP format. A well-formed XML fragment enclosed within SOAP elements is a SOAP message. When using SOAP, a client-side component allows an application to invoke XML Web service operations by using a Web Services Description Language (WSDL) file. Also, a server-side component maps invoked XML Web service operations described by WSDL and a Web Services Meta Language (WSML) file.

In accordance with the present invention, the XML Web services preferably are built and run on the .NET platform available from Microsoft Corporation, Redmond, Wash. The .NET platform also enables integration of XML Web services with other computers, smart devices, and other Web-based services. Two tools of the .NET platform are Visual Studio- .NET and .NET Framework.

Visual Studio.NET is a multi-language development tool that allows developers quickly build XML Web services and applications that scale easily, using the language of their choice. The supported languages are: Visual Basic, which includes new object-oriented programming features, Visual C++, which advances Windows-based development and enables you to build .NET applications, and C#, which brings RAD (Rapid Application Development) to C and C++ developers. Other languages will be supported by third parties: Perl, Python, COBOL, and Eiffel.

The .NET Framework is a high-productivity, standards-based, multi-language application execution environment that handles essential plumbing chores and eases deployment. The .NET Framework improves the reliability, scalability, and security of applications. It includes several parts: the Common Language Runtime, a rich set of class libraries for building XML Web services, and ASP.NET, the next generation Active Server Pages.

When planning a new Web service, its interface is described in the Web service's WSDL (Web Services Description Language) document. The WSDL document describes the messages that the Web service understands, the format of its responses to those messages, the protocols that the service support, and so on. The WSDL document can be divided into two groups: the Abstract Definitions Group and the Concrete Descriptions Group. The abstract sections define SOAP messages in a platform- and language-independent manner; they do not contain any machine- or language-specific elements. The concrete sections are site-specific, machine-specific, or language-specific. The abstract elements are types, message, and portType. The concrete elements are binding and service. The root of any service description file is the <definitions> element.

Runtime Processes

In accordance with the above, the present invention is directed to consuming incoming SOAP messages and through the use of a Web services adapter, forwarding the message to a port within BizTalk. A port is defined by the location to which messages are sent or from which messages are received, and the technology that is used to implement the communication action.

Figure 2:
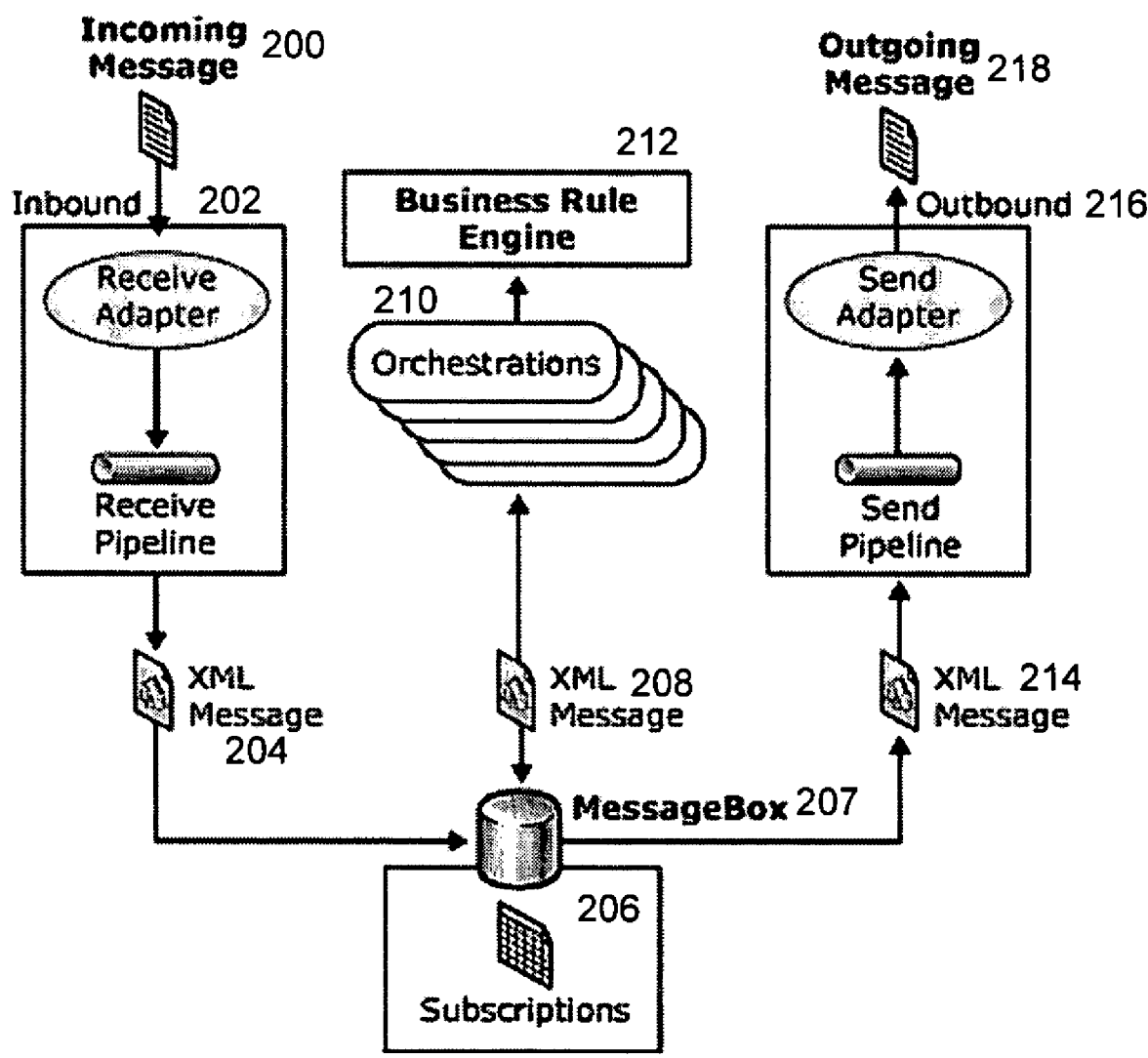
FIG. 2 is an exemplary data flow showing how a Web method running under the BizTalk Web services adapter submits and returns data.

Referring now to FIG. 2, there is illustrated an exemplary data flow showing how a Web method running under the BizTalk Web services adapter submits and returns data. Initially, a business process is implemented as one or more orchestrations 210, each of which consists of executable code. Orchestrations are not created by writing code in a language such as C#, rather a business analyst uses the Orchestration Designer for Business Analysts (a snap-in for Microsoft Visio, available from Microsoft Corp., Redmond, Wash.) to graphically organize a defined group of shapes to express the conditions, loops, and other behavior of the business process. Business processes may also use the Business Rule Engine 212, which provides an alternate, simpler and more easily modified way to express the rules in a business process.

Each orchestration creates subscriptions 206 to indicate the kinds of messages it receives. As illustrated in FIG. 2, the message processing proceeds as follows. An incoming message 200 is received through a receive adapter 202. Different adapters provide different communication mechanisms, so a message might be acquired by accessing a Web service, reading from a file, or in some other way. The message is processed through a receive pipeline. This pipeline may contain components that perform tasks such as converting the message from its native format into an XML document and validating its digital signature.

Next, the message is delivered to a database called MessageBox database 207, which is implemented by using Microsoft SQL Server, also available from Microsoft Corp. When a message arrives in the MessageBox database 207, that message is dispatched to its target orchestration (as message 208 in the forward direction), which takes whatever action the business process requires. The result of this processing is typically another message 208 (in the return direction), which is produced by the business process and saved in the MessageBox database 207.

When message 208 is processed by a send pipeline 216, it is sent as a message 214, which may convert it from the internal XML format used by BizTalk Server 2004 to the format required by its destination. Optionally, a digital signature, etc. may be added to the message 214. The message 214 is sent out through a send adapter as message 218, which uses an appropriate mechanism to communicate with the application for which this message is destined.

At runtime, each part of the SOAP request message corresponds to a parameter to be passed to the target web method. When a web method in the target assembly is invoked, an array of .Net objects is created for each parameter specified in the signature of the target method. .Net Reflection API's are used to interrogate the target web method for the set of required parameters. The name of method parameter corresponds to the name of a message part for all input and input/output parameters on the target method. If a message part is not found that corresponds to a required parameter, the transport suspends the request message and terminates further processing attempts. The data portion of a message part is an XML serialized value of the .Net object type that corresponds to the target web method parameter. Serialization and de-serialization of the part data are preferably performed by the System.Xml.Serialization.XmlSerializer class.

The consuming runtime is capable of adding known SOAP headers to out-going web-method calls. A header is considered to be "known" if usage of the header is outlined by the WSDL for a given web-method and therefore has a corresponding representation in a generated .Net client proxy. Only headers represented in the proxy can be accessed since the consuming runtime invokes web services through this proxy.

Header values are stored in the request-message context object. The namespace within the context for any SOAP headers are identical to the namespace of the target web-service. This is how the runtime determines which namespace to read context properties from. Property names directly correspond to header names as they appear in the WSDL. Header values must be the .Net XML serialized representations of the .Net type corresponding to each header. The runtime will use an instance of the System.Xml.Serialization.XmlSerializer class to de-serialize this value back into a .Net object that will be set on the proxy instance before invoking the target web-method.

The consuming runtime uses reflection on the proxy class method to determine the following information regarding headers: (1) the names of all headers associated with a method; (2) the direction of flow for each header (e.g. In, InOut, or Out); and (3) is the header optional or required.

Header values will be set according to the gathered information and the following conditions: (1) a header value will be read from the context if it is marked as In or InOut. Out headers are not required to be set on the request-message context; (2) message processing continues if the header is marked as optional but does not exist in the context; (3) message processing will fail if the header is marked as required but does not exist in the context; and (4) an unrecoverable error will be generated in this case.

The SOAP response messages are created as follows. For every input/output parameter, output parameter, and the return value (if applicable), a message part is created with the name of the message part set to the name of the parameter or Operation name with "Return" appended for the return value. The .Net object for each parameter is serialized into the message part data stream using the System.Xml.Serialization.XmlSerializer class.

The consuming runtime is capable of adding known SOAP headers to response messages generated from successful request-message processing. A header is considered to be "known" if usage of the header is outlined by the WSDL for a given web-method and therefore has a corresponding representation in a generated .Net client proxy. Only headers represented in the proxy can be accessed since the consuming runtime invokes web services through this proxy.

Header values are stored in the response-message context object. The namespace within the context for any SOAP header will be identical to the namespace of the target web-service. Header names will directly correspond to property names in the context. Header values will be the .Net Xml serialized representations of the .Net type corresponding to each header. The runtime will use an instance of the System.Xml.Serialization.XmlSerializer class to serialize the header .Net object into an Xml string before adding it to the response-message context.

A header value will be added to the context according to the following rules: (1) The direction of flow for the header was InOut or Out; and (2) the header object value is not equal to null after executing the target web-method.

Design-Time Processes

As will be described in detail below, the present invention includes a design-time wizard that generates an ASP.NET Web Service project that implements a proxy for communicating with a business process orchestration. The generated code internally calls a server proxy, which submits the message into BizTalk.

Figure 3:
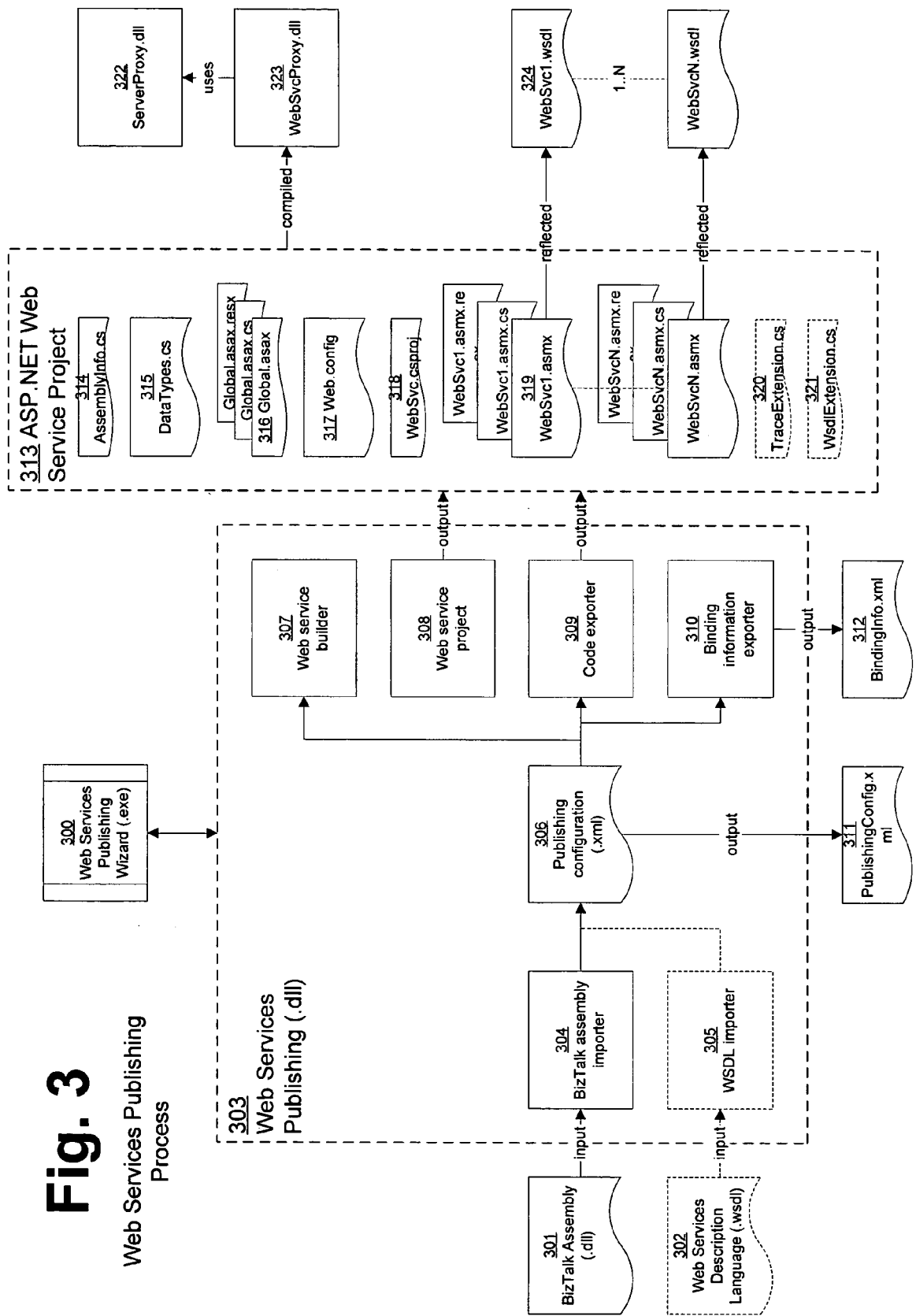
FIG. 3 is an overview of the process of generating a Web service.

Referring now to FIG. 3 there is provided a overview of the process of generating a Web Service from a BizTalk assembly such that backend business process orchestrations that are not compatible with Web services may be exposed as Web services by the present invention. A "wizard" user interface 300 controls the overall functionality of transforming a BizTalk Assembly (e.g., .dll) 302 to a Web Service (e.g., ASP.NET project) 313. The wizard walks the user through the various parameters needed by the underlying components and controls the overall process. The publishing process is implemented by a web services publishing assembly 303.

The BizTalk assembly importer 304 takes the BizTalk Assembly 301 as input and generates an internal publishing configuration 306 that describes the web service implementation. This component uses .NET Reflection to extract necessary information about the orchestrations and ports contained in the assembly and selected for publishing by the user. Each message in the BizTalk assembly may be one of the following types: (1) .NET class, e.g., System.String or System.DateTime, (2) Multi-part message type consisting of 1 to N parts each of which can be a .NET class or schema, or (3) Schema produced in, e.g., the BizTalk editor.

The publishing configuration 306 is a hierarchical description of the web service to be implemented. It provides a common destination for information imported from various sources: BizTalk assemblies, WSDL files, or user editing. Also, the publishing configuration provides a common source for various web service related outputs. Since the publishing configuration is persistable as an XML file, it may be used to rerun the publishing process with the same inputs.

The Web service builder component 307 takes the publishing configuration 306 from the previous stage of the process and passes it to the web service builder 307 which uses components 308-310 to produce the web service project output. The web service project 308 component generates the overall ASP.NET Service Project 313 which consists of files 314, 316, 317, 318, 320, and 321. The code exporter component 309 generates the web services and web methods 319 and data types 315 used as parameters to the web methods (e.g., C#). The resulting code is added to the ASP.NET Web Service project 313 that the user can then build upon.

An exemplary portion of the web service code 319 may be as follows:

```
[System.Web.Services.WebMethodAttribute( )]
[System.Web.Services.Protocols.SoapDocumentMethodAttribute
("http://ModuleTns/WebSvcPubTest_SimpleOrchestration_SimplePort/
Echo", OneWay=false,
Use=System.Web.Services.Description.SoapBindingUse.Literal,
ParameterStyle=System.Web.Services.Protocols.SoapParameterStyle.
Default)]
    [return:
System.Xml.Serialization.XmlElementAttribute(Namespace=null,
ElementName="part")]
    public string
Echo([System.Xml.Serialization.XmlElementAttribute(Namespace=null,
ElementName="part")] string part)
    {
        System.Collections.ArrayList inHeaders = null;
        System.Collections.ArrayList inoutHeaders = null;
        System.Collections.ArrayList inoutHeaderResponses = null;
        System.Collections.ArrayList outHeaderResponses = null;
        System.Web.Services.Protocols.SoapUnknownHeader[ ]
unknownHeaderResponses = null;
        // Parameter information
        object[ ] invokeParams = new object[ ] {
            part};
        Microsoft.BizTalk.WebServices.ServerProxy.ParamInfo[ ]
inParamInfos = new Microsoft.BizTalk.WebServices.ServerProxy.
ParamInfo[ ] {
            new
Microsoft.BizTalk.WebServices.ServerProxy.ParamInfo(typeof(string),
"part")};
        Microsoft.BizTalk.WebServices.ServerProxy.ParamInfo[ ]
outParamInfos = new Microsoft.BizTalk.WebServices.ServerProxy.
ParamInfo[ ] {
            new
Microsoft.BizTalk.WebServices.ServerProxy.ParamInfo(typeof(string),
"part")};
        string bodyTypeAssemblyQualifiedName = "System.String,
mscorlib, Version=1.0.5000.0, Culture=neutral, PublicKeyToken=b77a" +
"5c561934e089";
        // BizTalk invocation
        object[ ] invokeResults = this.Invoke("Echo",
invokeParams, inParamInfos, outParamInfos, 0,
bodyTypeAssemblyQualifiedName, inHeaders,
inoutHeaders, out inoutHeaderResponses, out outHeaderResponses, null,
null, null, out unknownHeaderResponses, false, false);
        string returnValue = ((string)(invokeResults[0]));
        return returnValue;
    }
```

FIGS. 22-23 also show exemplary web service code generated from corresponding XLANGS input.

The output of the code exporter component 309 consists of an .asmx file and associated .cs file, which is the actual Web service. In generating the actual code, using .NET CodeDom, the following steps may be performed: The code exporter component 309 generates a CodeCompileUnit for each web service, a class derived from ServerProxy is made for each web service, and the body of each web method specific is generated. Also, a CodeCompileUnit is generated to hold the .NET types used as parameters and return values by the web methods. Next, the CSharpCodeProvider/Generator's individual constructs output the end result. The output is shown by 319 Web service .asmx and .cs files and 315 DataTypes.cs file.

Accordingly, an exemplary Web service class may be as follows:

```
[System.Web.Services.WebServiceBindingAttribute(Name="MyServiceSoap",
Namespace="http://www.microsoft.com/BizTalk")]
[System.Web.Services.WebServiceBindingAttribute(Name="WebSvcPubTest_SimpleOrchestration_
SimplePort", Namespace="http://ModuleTns")]
[System.Web.Services.WebServiceAttribute(Name="WebSvcPubTest_SimpleOrchestration_
SimplePort", Namespace="http://ModuleTns", Description="BizTalk
assembly \"WebSvcPubTest, Version=1.0.0.0, Culture=neutral,
PublicKeyToken=a25c862bf4c35d82\" published web service.")]
public sealed class WebSvcPubTest_SimpleOrchestration_SimplePort :
Microsoft.BizTalk.WebServices.ServerProxy.ServerProxy
{
    ...
}
```

The BizTalk assembly importer 304 will now be described in further detail, and in particular the process of mapping XLANG/s to the web service implementation will be described. XLANG is the XML business process language implemented in BizTalk Server and is an extension of WSDL. An XLANG service description is a WSDL service description with an extension element that describes the behavior of the service as a part of a business process.

As part of the process of FIG. 3, the, the publishing configuration 306 is generated from the Assembly 302 by mapping XLANG to a web service implementation description. Types in WSDL correspond to the types declared in a messagetype. In XLANG, a messagetype part can be one of at least two types: XSD schema or Common Language Runtime (CLR) type. For types based on schemas, the Code exporter component 309 generates .NET classes to represent the schemas by using XmlSchemaImporter and XmlCodeExporter classes in the .NET Framework. The code exporter component generates type references and adds assembly references as needed for Common Language Runtime (CLR) types such as System.String or System.Date. When a client queries the web service for a WSDL file 324, ASP.NET examines the published web services assembly using reflection.

XLANG messages and messagetype parts map to web method parameters and return values in the web service implementation. There are two types of messages to consider: single-part and multi-part. Single-part messages contain a single part named "part". Multi-part messages may contain 1 to N parts with user specified names. An input parameter name in the implementation is obtained by taking the messagetype part name for each part of the request message. An output parameter name is obtained by taking the messagetype part name for each part of the request message and appending an underscore ("_"). This ensures the parameter names are unique and valid C# identifier names for a given web method.

A service contains 0 . . . N ports. Only public ports are exported; private and internal ports are not exposed. A service port in XLANG/s directly maps to a web service class in the generated implementation The class name is obtained by concatenating the XLANG/s module name, service name, and port name separated by underscores ("_"), and replacing all dots (".") with underscores. This is done to ensure a valid unique C# class name and uniqueness of the service name in the WSDL, a WSDL requirement.

Design-Time Processes User Interface

Figure 4:
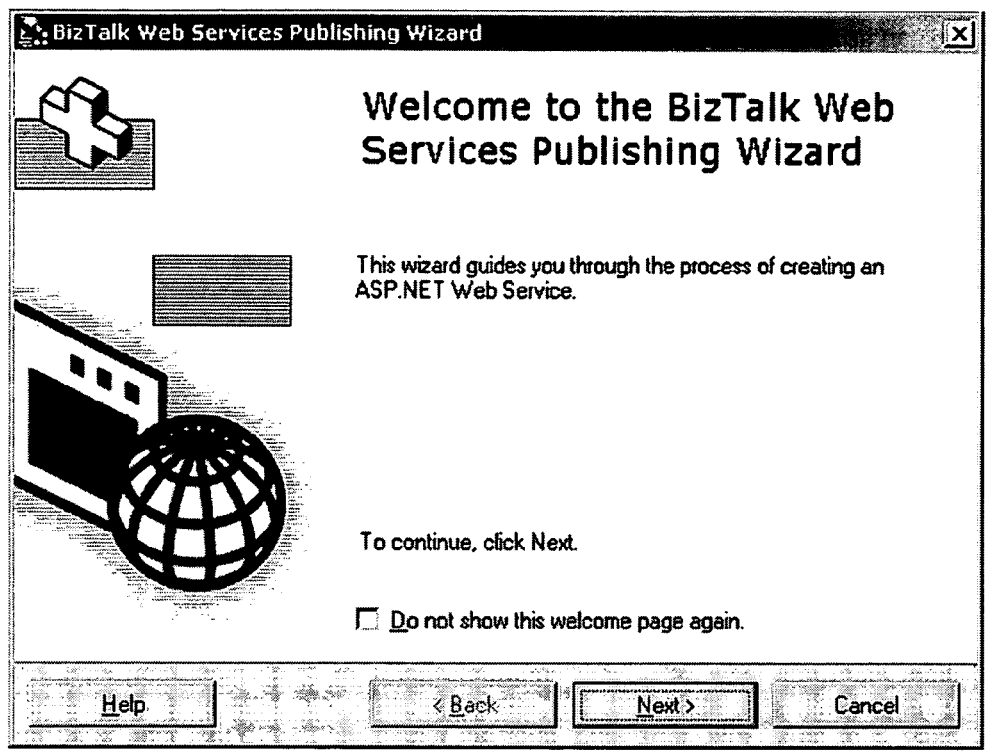
FIGS. 4-20 are exemplary user interfaces to guide users through the process of defining a Web service.
Figure 5:
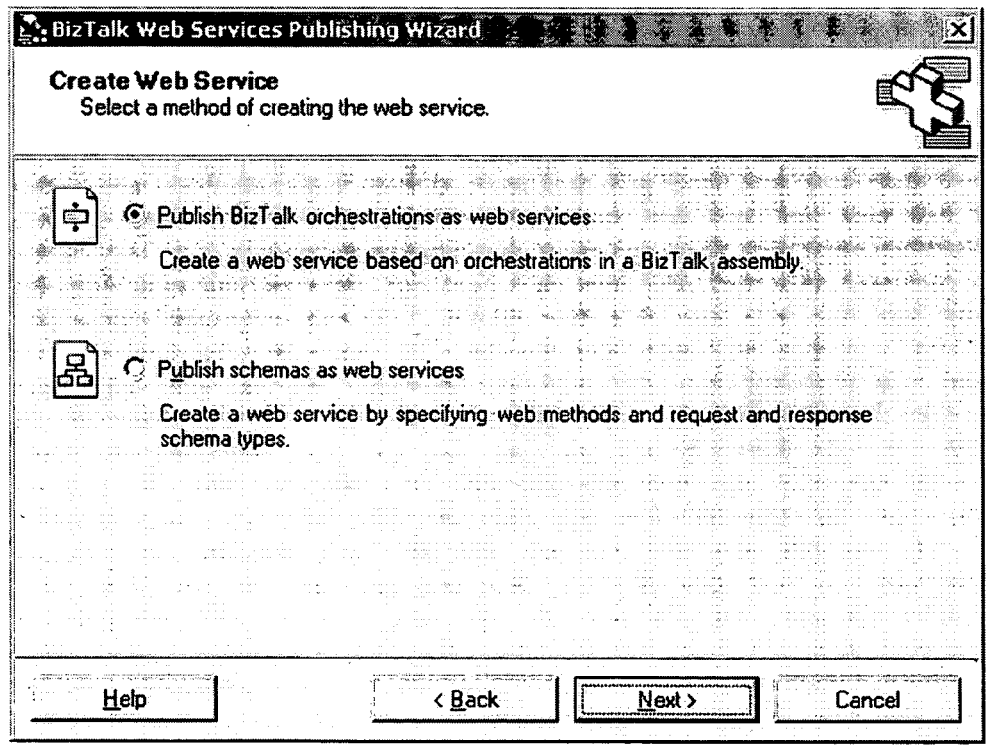
Figure 6:
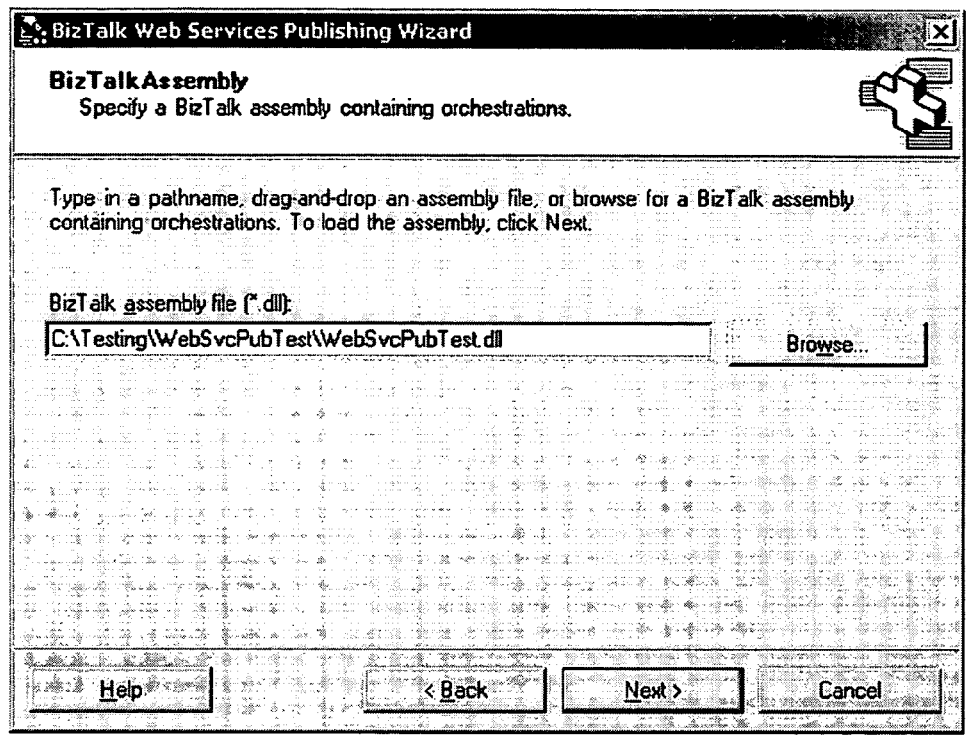
Figure 7:
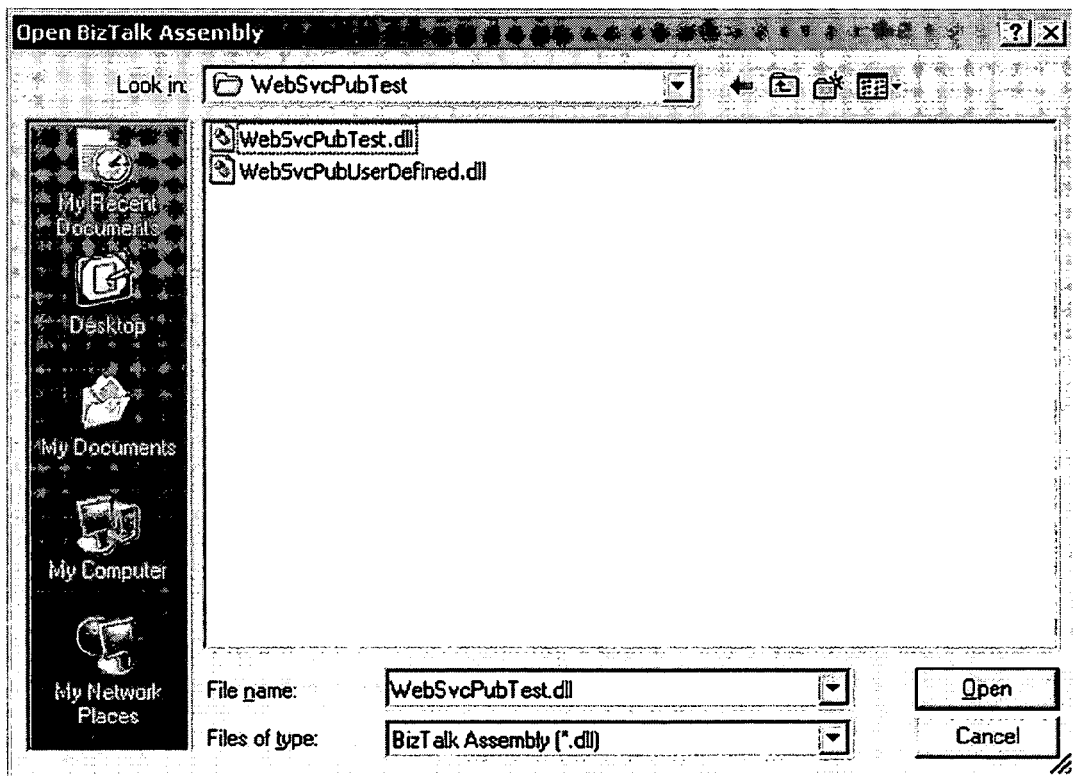
Figure 8:
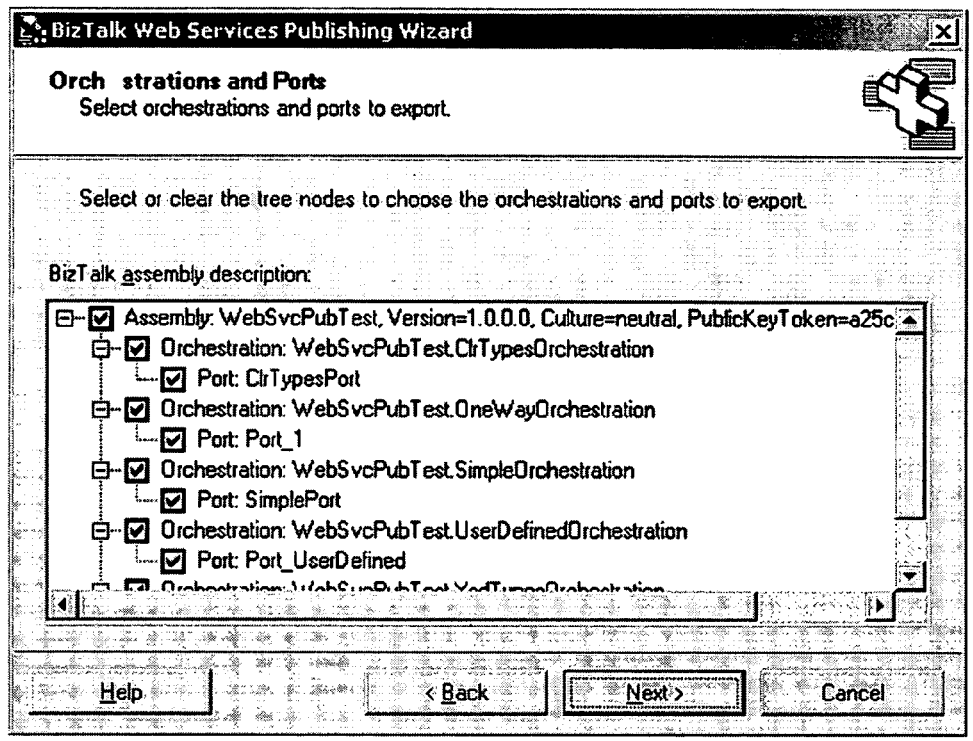

Referring now to FIGS. 4-20, there are exemplary user interfaces for the Web services publishing wizard 300 that guides the user through the process of exposing a BizTalk orchestration (i.e., backend system or workflow) as a web service. FIG. 4, illustrates the welcome UI and FIG. 5 illustrates the UI for selecting how the user wishes to create a Web service. The options are to publish BizTalk orchestrations as web services, or to publish schemas as web services. If the user selects to publish BizTalk orchestrations as web services, the UIs of FIGS. 6-8 are presented wherein the user selects a BizTalk Assembly by optionally typing the full path and file name or by browsing (FIG. 7) to the Assembly dll file. The browse button of FIG. 6 opens a standard OpenFileDialog. Next, FIG. 8 is the UI for selecting orchestrations to export. The tree view shows the assembly, orchestrations, and ports. User can check or uncheck nodes to specify which services and ports will appear in the generated WSDL file. Checking a node will check all child nodes; unchecking a node will uncheck all child nodes. Nodes with partially selected children will be shown with grayed out checkbox indicating partial selection.

Figure 9:
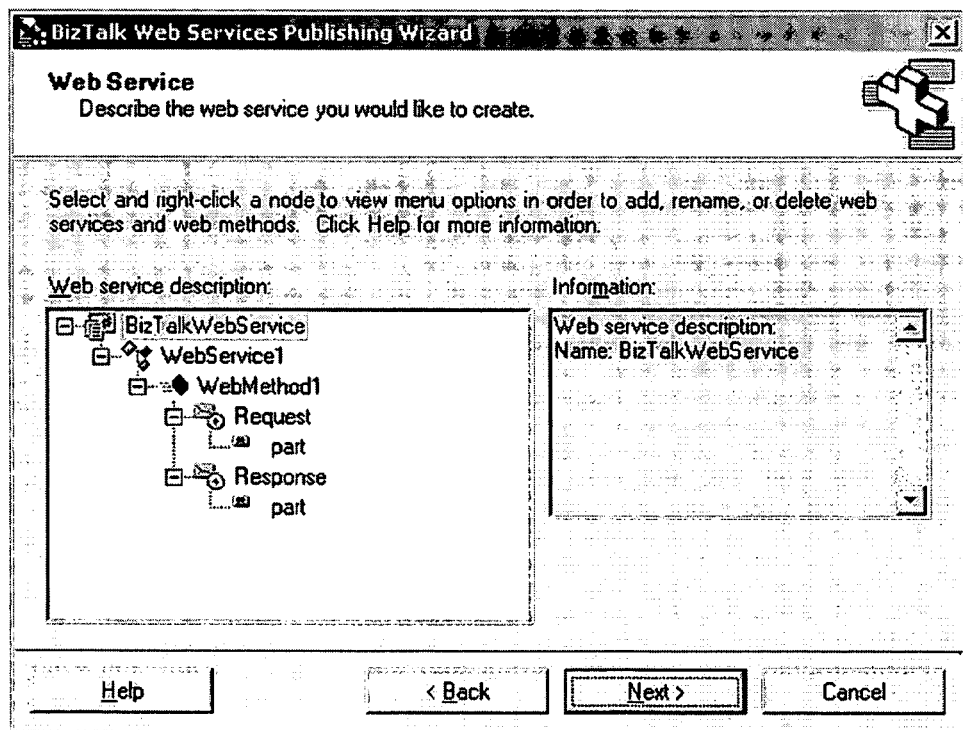
Figure 10:
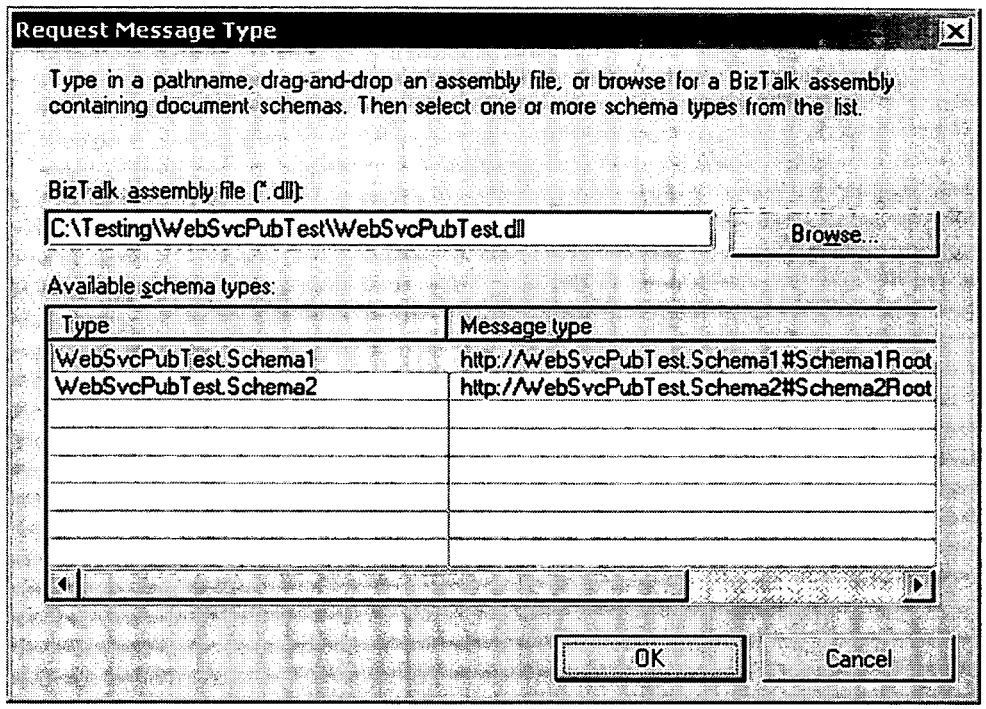

If a user selects to publish schemas as web services in the UI of FIG. 5, the UIs of FIGS. 9 and 10 are provided. Here the user describes the web service and methods and specifies the request and response message types by selecting XSD schema types from assembly files containing document schemas. The UI provides a means of editing the internal web service implementation description, the publishing configuration 306 in FIG. 3.

Figure 11:
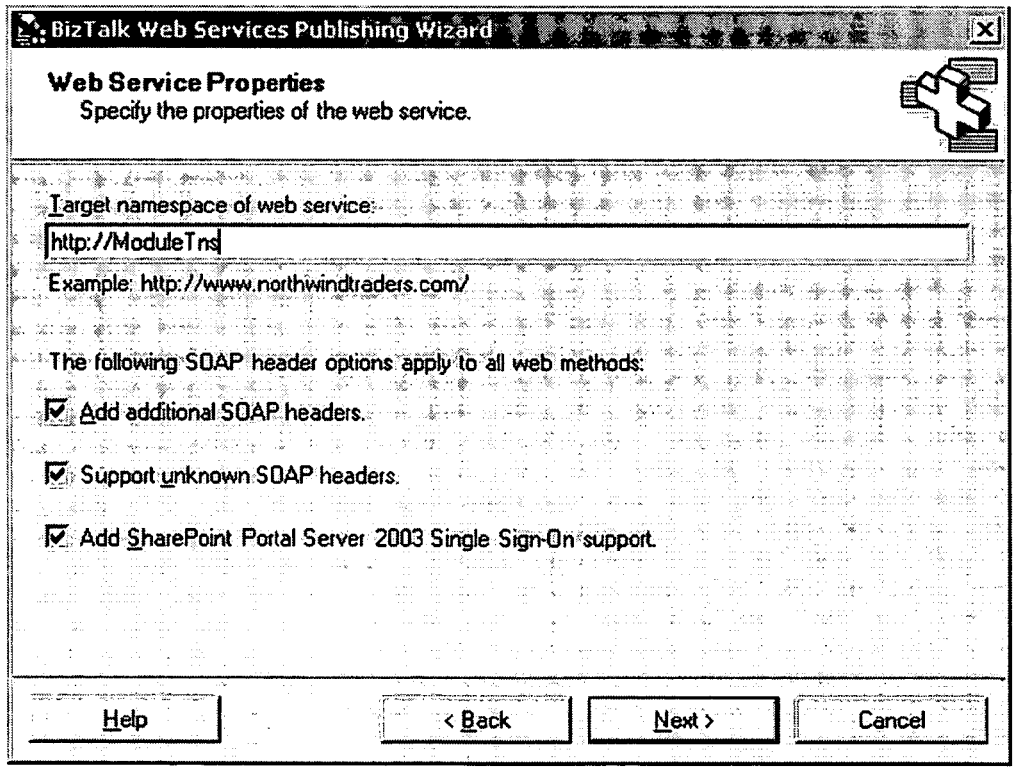
Figure 12:
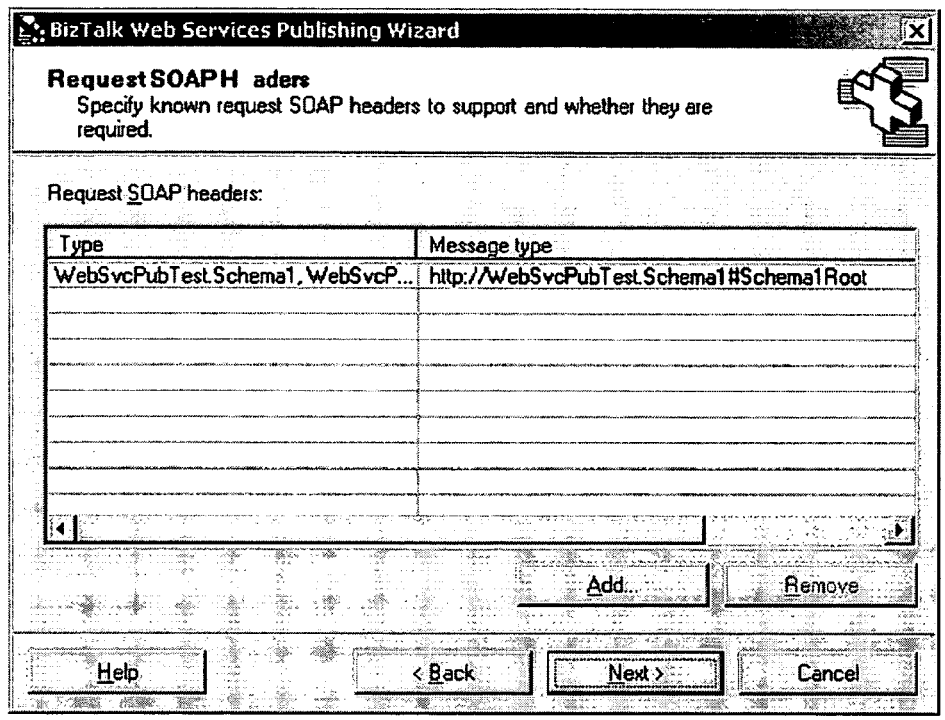
Figure 13:
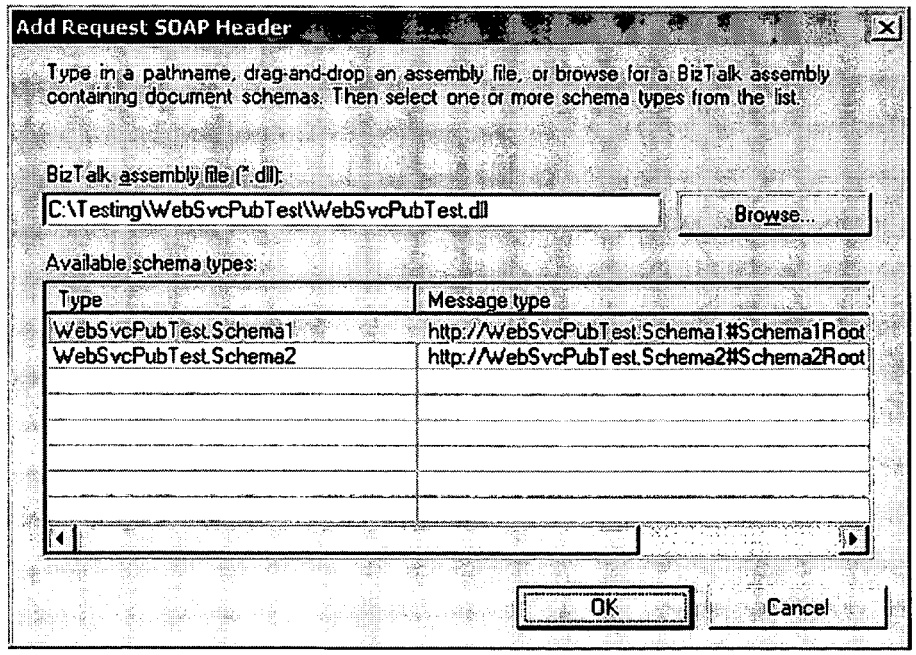

Both options in FIG. 5 take the user to a Web Services Properties UI, shown in FIG. 11. Users may specify SOAP header options, such as adding additional SOAP headers, supporting unknown SOAP headers, and adding SharePoint Portal Server 2003 Single Sign-On support. Depending on which options are selected (as shown, all three options are selected in FIG. 11), the UI of FIG. 12 is presented where Request SOAP headers are specified. FIG. 13 is the UI for specifying assembly files or schemas in accordance with the Request SOAP headers specified in FIG. 12.

Figure 14:
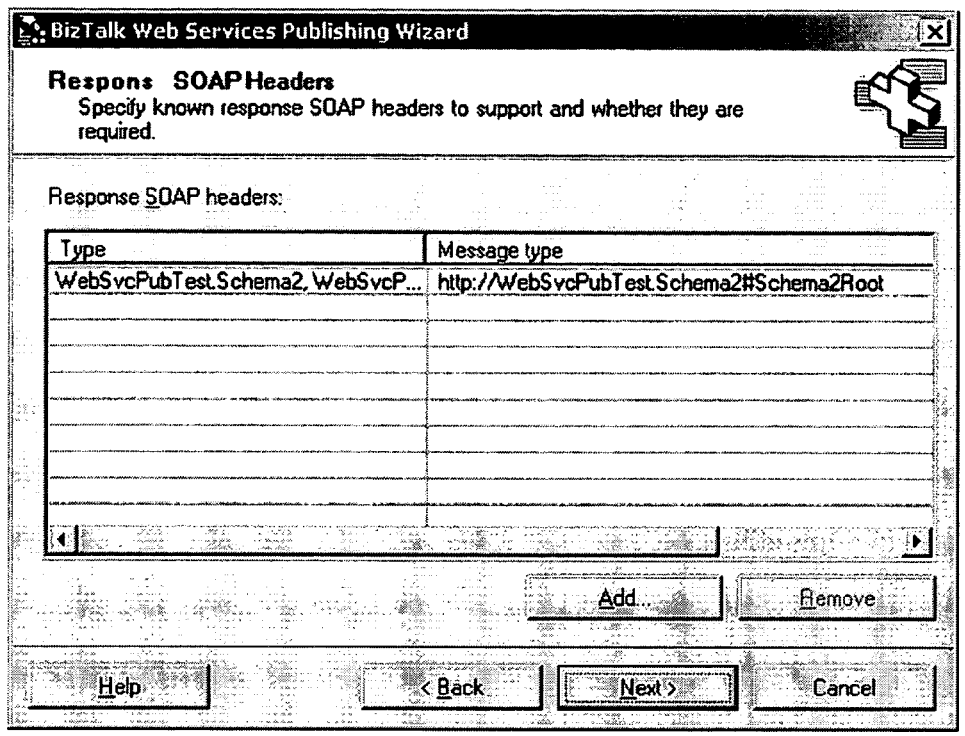
Figure 15:
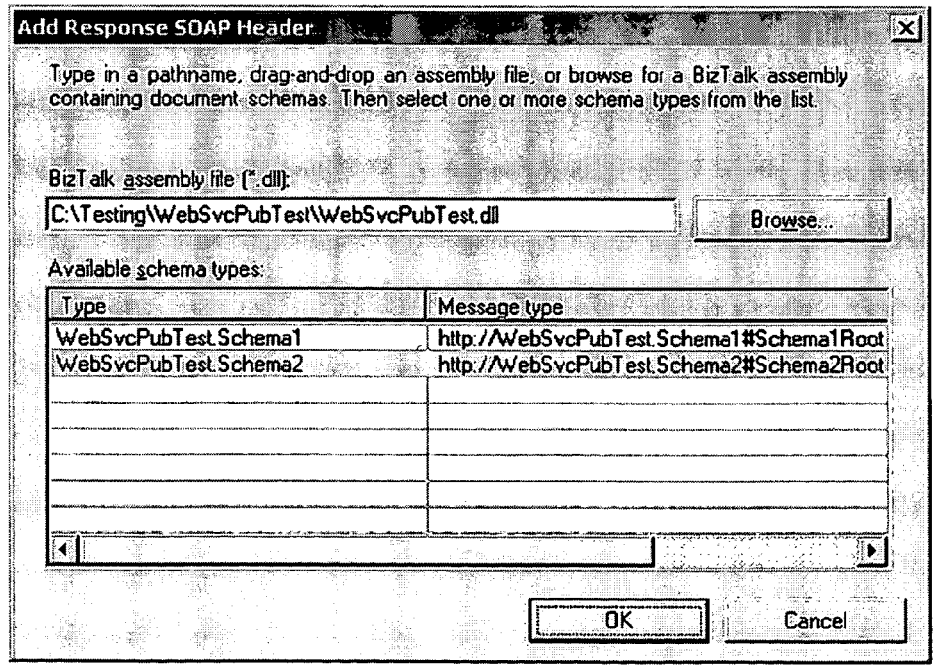
Figure 16:
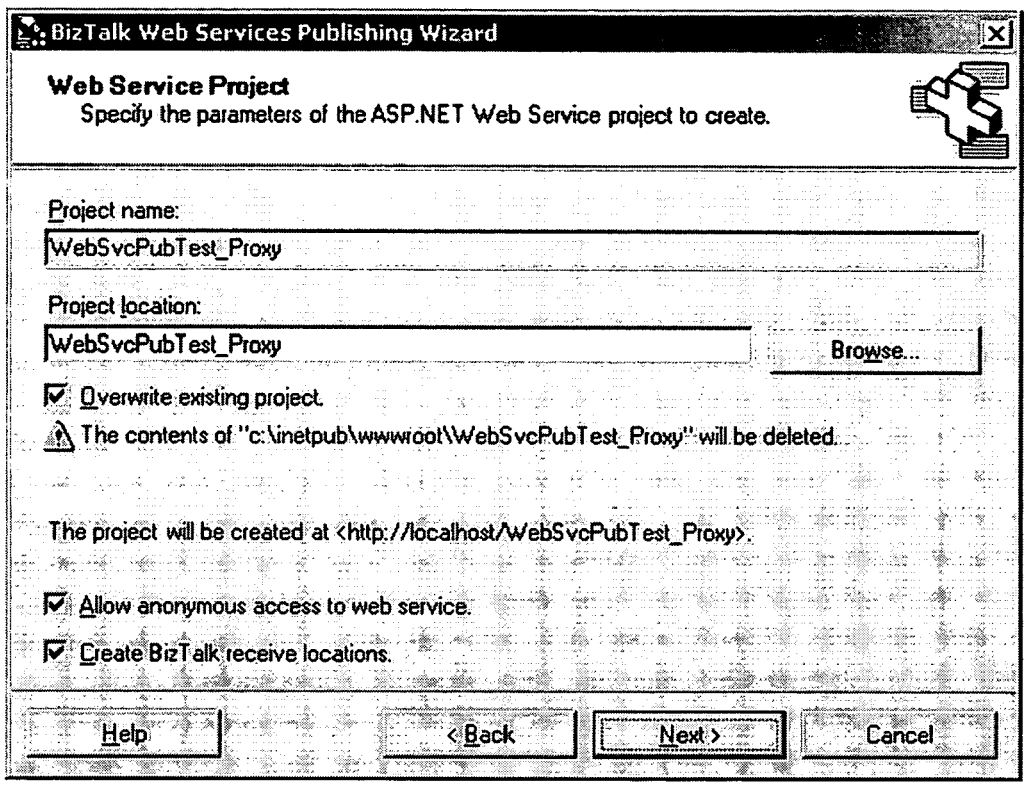
Figure 17:
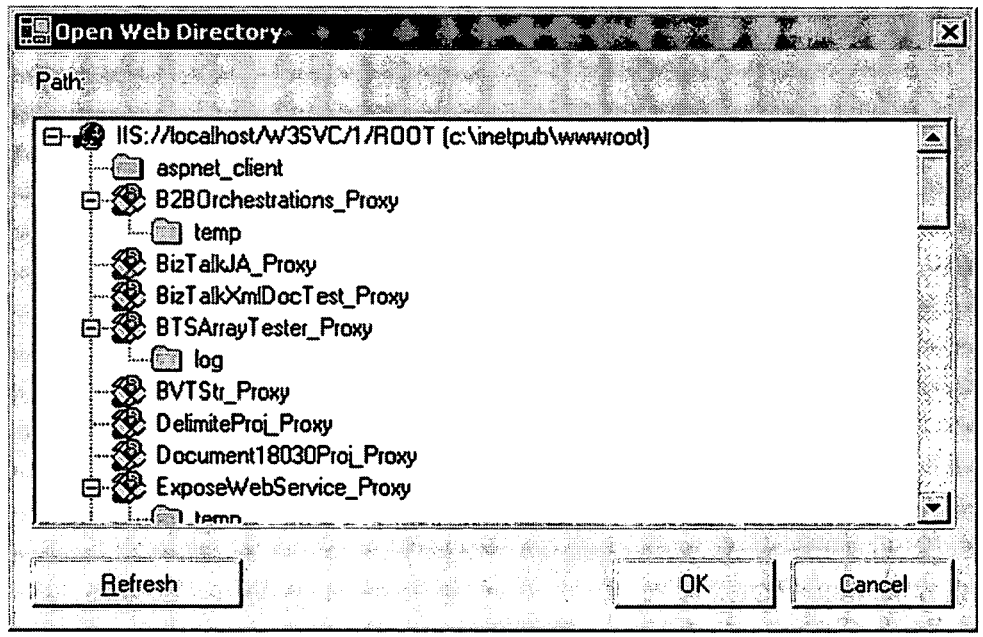

The UI of FIG. 14 is where users specify the Response SOAP headers, and FIG. 15 is the UI for specifying assembly files or schemas in accordance with the Response SOAP headers specified in FIG. 14. FIG. 16 the UI for specifying the name of the web services project to create along with other options: overwrite existing project, allow anonymous access to web service, and create BizTalk receive locations. FIG. 17 is a dialog for browsing the location of the web services project.

Figure 18:
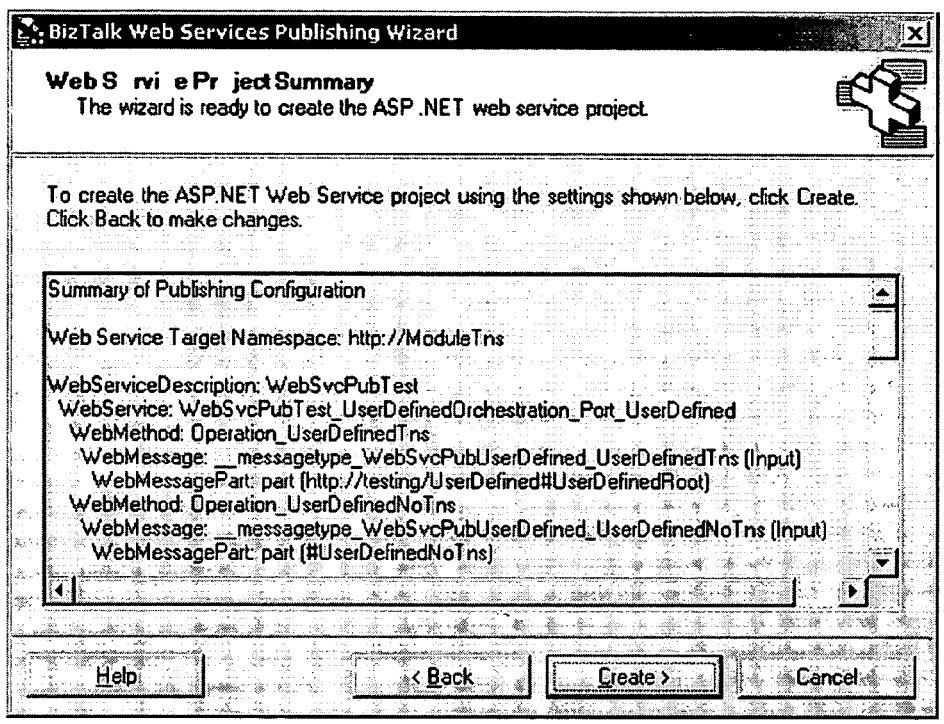
Figure 19:
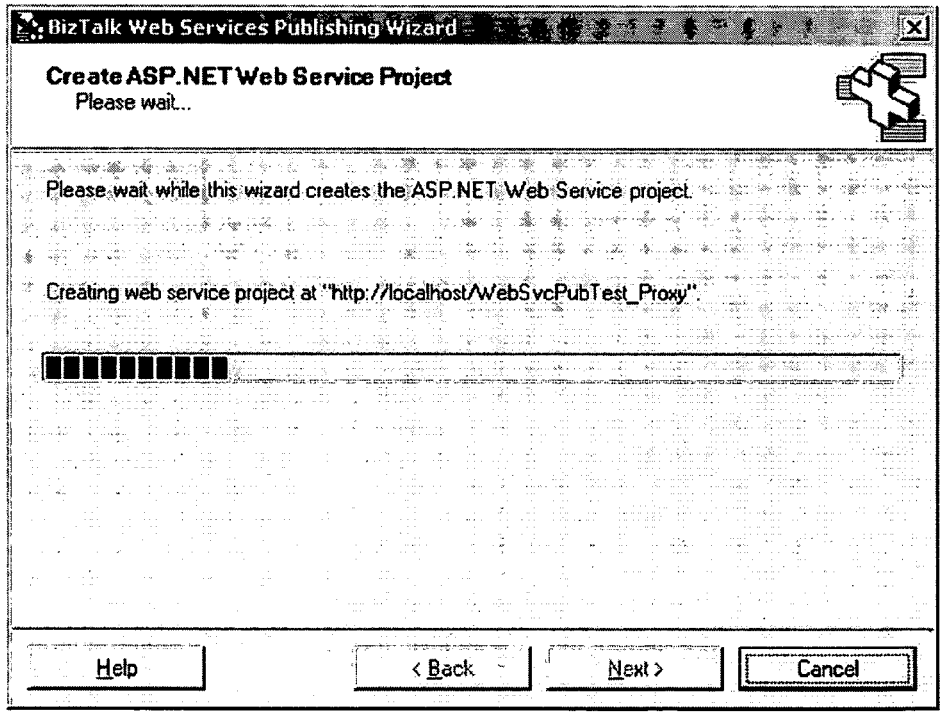
Figure 20:
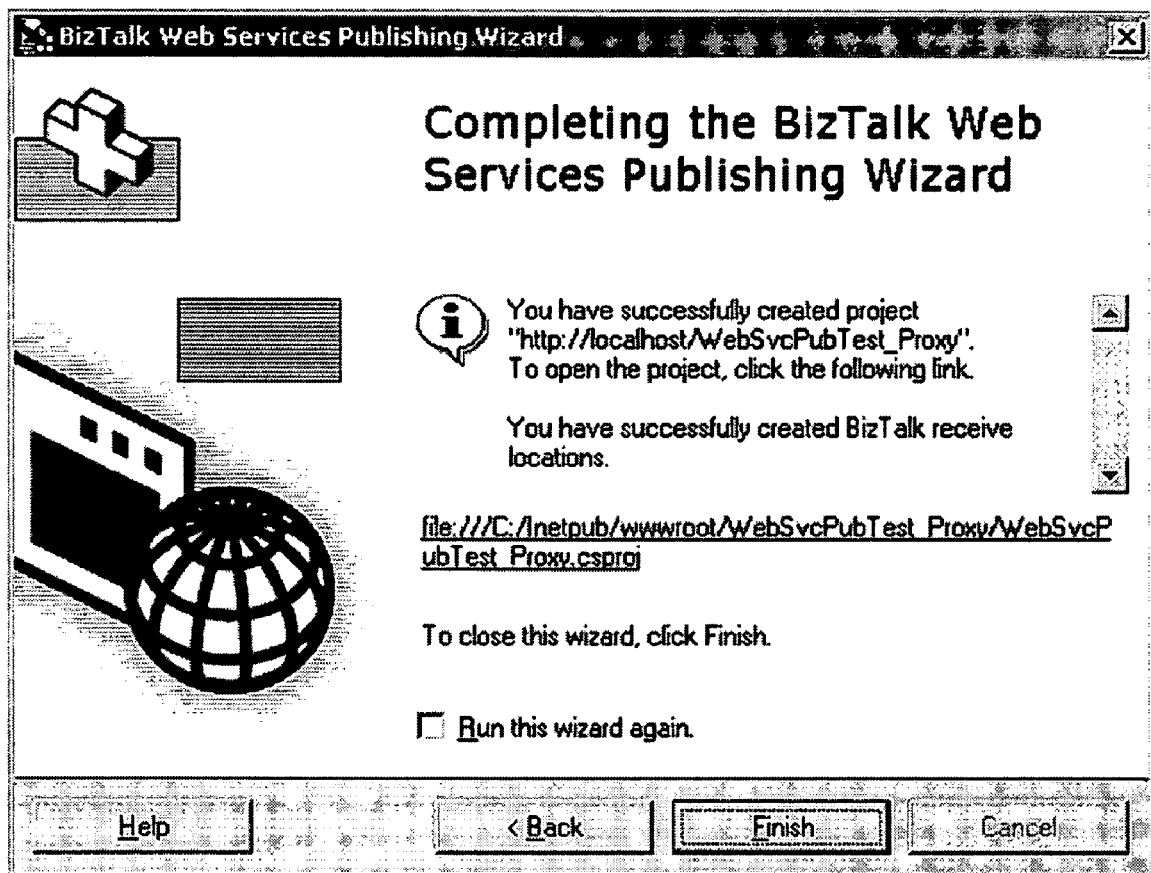
Figure 21:
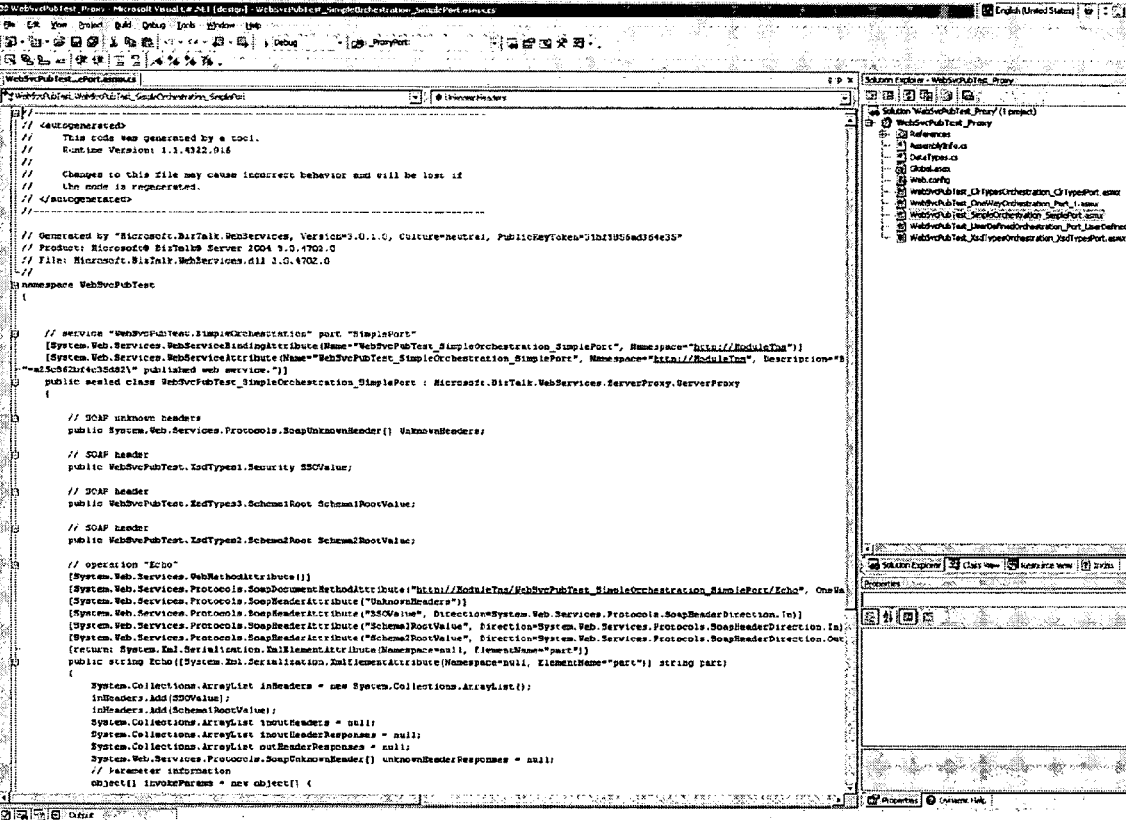
FIG. 21 shows a portion of exemplary code that is generated through the process of FIGS. 4-20.

FIG. 18 is a summary provided to the user to prior to creating the web service. FIG. 19 is the progress UI for informing the user of the wizard's progress in creating the ASP.NET Web Services solution. Upon completion, the page auto-advances to the completion page. FIG. 20 illustrates the UI for the completion page that summarizes the wizard task. The link opens the resulting solution if the web service project is created successfully. Clicking the link on completion page of wizard opens newly created project, an example of the generated code is illustrated in FIG. 21.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, may be applied to a serialization format other than XML, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A computer-implemented method for generating an XML Web service to expose a business process orchestration, the method comprising:
    generating a web service implementation and web services description language (WSDL) from an assembly representative of said business process orchestration, wherein generating the web service implementation comprises using reflection to extract information regarding the business process orchestration and ports contained in the assembly;
    mapping XLANG messages and messagetype parts to web method parameters and return values in the web service implementation such that an input pararmeter name in the implementation is obtained by taking a messagetype part name for each part of a request message and an output parameter name is obtained by taking the messagetype part name for each part of the request message;
    generating orchestration proxy code from the web service implementation;
    generating the web service implementation and WSDL from a selection of schemas provided by a BizTalk Adapter; and
    wrapping said orchestration proxy code within a web method.

2. The method of claim 1, wherein the assembly is a BizTalk assembly and generating the web service implementation using reflection comprises using .NET Reflection to extract information regarding orchestrations and ports contained in the BizTalk assembly.

3. The method of claim 1, further comprising:
    generating or referencing CLR types (.NET classes) to represent XLANG message types.

4. The method of claim 1, wherein the output parameter name is obtained by taking the messagetype part name for each part of the request message and appending an underscore.

5. The method of claim 1, further comprising mapping XLANG ports and porttypes to a web service class in the implementation witch corresponds to a porttype element in a WSDL file.

6. The method of claim 5, wherein said web service class name is generated by concatenating an XLANG module name, service name, and port name separated by underscores and with all dots converted to underscores so as to produce a valid unique C# identifier name.

7. The method of claim 1, further comprising:
    creating an ASP.NET web service project from the web service implementation;
    generating data types (.NET classes) used as the web method parameters; and
    generating each web method specific.

8. A system adapted to generate an XML Web service to expose a business process orchestration, the system comprising:
    at least one processor;
    memory communicatively coupled with said at least one processor, the memory having stored therein instructions executable on said at least one processor, the instructions for performing the following:
        generating a web service implementation and web services description language (WSDL) from an assembly representative of said business process orchestration, wherein generating the web service implementation comprises using reflection to extract information regarding the business process orchestration and ports contained in the assembly;
        mapping XLANG messages and messagetype parts to web method parameters and return values in the web service implementation such that an input parameter name in the implementation is obtained by taking the messagetype part name for each part of a request message and an output parameter name is obtained by taking the messagetype part name for each part of the request message;
    generating orchestration proxy code from the web service implementation;
        generating the web service implementation and WSDL from a selection of schemas provided by a BizTalk Adapter; and
        wrapping said orchestration proxy code within a web method.

9. The system of claim 8, wherein the instructions for generating the web service implementation using reflection comprise using NET Reflection to extract information regarding orchestrations and ports contained in a BizTalk assembly.

10. The system of claim 8, further comprising instructions for generating or referencing CLR types (.NBT classes) to represent XLANG message types.

11. The system of claim 8, wherein the output parameter name is obtained by taking the messagetype part name for each part of the request message and appending an underscore.

12. The system of claim 8, further comprising instructions for mapping XLANG ports and porttypes to a web service class in the implementation which corresponds to a porttype element in a WSDL file.

13. The system of claim 12, wherein a web service class name is generated by concatenating the an XLANG module name, service name, and port name separated by underscores and with all dots converted to underscores so as to produce a valid unique C# identifier name.

14. The system of claim 8, further comprising instructions for performing:
    creating an ASP.NET web service project from the web service implementation;

generating data types (.NET classes) used as the web method parameters; and generating each web method specific.

15. A computer-readable storage medium having stored thereon information comprising;

computer-readable instructions for generating a web service implementation and web services description language (WSDL) from an assembly representative of said business process orchestration, wherein generating the web service implementation comprises using reflection to extract information regarding the business process orchestration and ports contained in the assembly;

computer-readable instructions for mapping XLANQ messages and messagetype parts to web method parameters and return values in the web service implementation such that art input parameter name in the implementation is obtained by taking the messagetype part name for each pan of a request message and an output parameter name is obtained by taking the messagetype part name for each pan of the request message;

computer-readable instructions for generating orchestration proxy code from the web service implementation;

computer-readable instructions for generating the web service implementation and WSDL from a selection of schemas provided by a BizTalk Adapter; and computer-readable instructions for wrapping said orchestration proxy code within a web method.

16. The computer-readable storage medium of claim 15, wherein the computer-readable instruction for generating the web service implementation using reflection comprise using .NET Reflection to extract information regarding orchestrations and ports contained in a BizTalk assembly.

17. The computer-readable storage medium of claim 15, further comprising computer-readable instructions for generating or referencing CLR types (.NET classes) to represent XLANG message types.

18. The computer-readable storage medium of claim 15, wherein computer-readable instructions for obtaining the output parameter name comprise taking the messagetype part name for each part of the request message and appending an underscore.

19. The computer-readable storage medium of claim 15, further comprising computer-readable instructions for mapping XLANG ports arid porttypes to a web service class in the implementation which corresponds to a porttype element in a WSDL file.

20. The computer-readable storage medium of claim 19, wherein computer-readable instructions for generating the web service class name comprise concatenating an XLANG module name, service name, and port name separated by underscores and with all dots converted to underscores so as to produce a valid unique C# identifier name.

21. The computer-readable storage medium of claim 15, further comprising computer-readable instructions for:

creating an ASP.NET web service project from the web service implementation;

generating data types (.NET classes) used as the web method parameters; and generating each web method specific.

* * * * *